US012693262B2

(12) United States Patent
Weiss

(10) Patent No.: US 12,693,262 B2
(45) Date of Patent: Jul. 28, 2026

(54) METHODS OF ANALYZING AND MONITORING INDUSTRIAL FLUIDS FOR CORROSIVE IONS USING CAPILLARY ELECTROPHORESIS

(71) Applicant: BL Technologies, Inc., Minnetonka, MN (US)

(72) Inventor: Noah Weiss, Cyprus, TX (US)

(73) Assignee: BL TECHNOLOGIES, INC., Minnetonka, MN (US)

( * ) Notice: Subject to any disclaimer, the term of this patent is extended or adjusted under 35 U.S.C. 154(b) by 275 days.

(21) Appl. No.: 18/554,552

(22) PCT Filed: Apr. 15, 2022

(86) PCT No.: PCT/US2022/025050
§ 371 (c)(1),
(2) Date: Oct. 9, 2023

(87) PCT Pub. No.: WO2022/225818
PCT Pub. Date: Oct. 27, 2022

(65) Prior Publication Data
US 2024/0192168 A1     Jun. 13, 2024

Related U.S. Application Data

(60) Provisional application No. 63/177,446, filed on Apr. 21, 2021.

(51) Int. Cl.
*G01N 27/447*          (2006.01)

(52) U.S. Cl.
CPC . *G01N 27/44791* (2013.01); *G01N 27/44782* (2013.01)

(58) Field of Classification Search
CPC ............... G01N 27/447; G01N 27/453; G01N 27/44791; G01N 27/44782
See application file for complete search history.

(56) References Cited

U.S. PATENT DOCUMENTS 5,366,601 A     11/1994 Jones et al.
5,582,705 A  * 12/1996 Yeung .............. G01N 27/44726
                                                          204/603
5,614,072 A      3/1997 Vigh et al.
(Continued)

FOREIGN PATENT DOCUMENTS

CN          105190306 A     12/2015
EP            3406762 A1     11/2018
(Continued)

OTHER PUBLICATIONS

An eBay advertisement to for a Beckman P/ace System 5000 Electrophoresis System 2025 (Year: 2025).*
(Continued)

*Primary Examiner* — Alexander S Noguerola

(57) ABSTRACT
Provided herein are methods for real-time monitoring of one or more industrial fluids for ionic species that involve analyzing a sample of the one or more industrial fluids using a system including a capillary electrophoresis device and a processor; detecting, by way of a detector, one or more ionic species in the sample; and generating, in real-time, by way of the processor, an ionic species data profile for the sample.

22 Claims, 6 Drawing Sheets

(56) References Cited

U.S. PATENT DOCUMENTS

| | | | | |
|---|---|---|---|---|
| 6,027,627 A * | 2/2000 | Li | .................... | G01N 27/44782 |
| | | | | 204/603 |
| 6,174,675 B1 * | 1/2001 | Chow | ....................... | B01L 7/52 |
| | | | | 435/6.19 |
| 2004/0070758 A1 * | 4/2004 | Kenseth | .......... | G01N 27/44721 |
| | | | | 356/344 |
| 2005/0161326 A1 | 7/2005 | Morita et al. | | |
| 2009/0142748 A1 | 6/2009 | Smith et al. | | |
| 2010/0117666 A1 * | 5/2010 | Wada | .................. | G01N 27/447 |
| | | | | 324/705 |
| 2014/0260708 A1 | 9/2014 | Harrell et al. | | |
| 2018/0362868 A1 | 12/2018 | Karaki et al. | | |

FOREIGN PATENT DOCUMENTS

| | | | | | | |
|---|---|---|---|---|---|---|
| GB | | 2061123 A | * | 5/1981 | ............ | B01D 27/00 |
| TW | | 200702660 A | | 1/2007 | | |
| WO | WO 2012157837 A1 | | * | 11/2012 | .......... | G21C 17/022 |
| WO | | 2019/099231 A1 | | 5/2019 | | |

OTHER PUBLICATIONS

Beckman-Coulter P/ACE™ MDQ Installation & Maintenance Guide Aug. 2021 (Year: 2021).*

Kokkonen et al., "On-line process monitoring of water-soluble ions in pulp and paper machine waters by capillary electrophoresis," Journal of Chromatography A, 1032 (2004) 243-252 (Year: 2004).*

FQE Chemicals web article—Part 19 Water Formed Scale, author unknown, https://fqechemicals.com/water-formed-scale/#:~:text= Ions%20such%20as%20Ca2,and%20produce%20substances% 20called%20scales. (Year: 2025).*

Kilinççeker et al., The Effect of phosphate lons (PO{3-}_4) on the Corrosion of Iron in Sulphat Solutions, Turkish Journal of Chemistry, vol. 23 No. 1, Jan. 1, 1999 (Year: 1999).*

Xu et al., "Effect of chloride ions on the corrosion behavior of carbon steel in an iron bacteria system," RSC Adv., 2022, 12, 15158 (Year: 2022).*

EPO machine-generated English language translation of Lim et al. WO 2012/157837 A1 (Year: 2012).*

Palmer et al., "On-Line Monitoring of Chloride and Sulfate in the Steam Cycle with a New Analytical Technique," PowerPlant Chemistry 2013, 15(1) (Year: 2013).*

Thomas Jovin, "Part III Related Methods—Multiphasic Zone Electrophoresis. IV. Design and Analysis of Discontinuous Buffer Systems With a Digital Computer," Annals of the New York Academy of Sciences/ vol. 209, Issue 1/ pp. 477-496, first published : Jun. 1973 (Year: 1973).*

International Search Report and Written Opinion, PCT/US2022/ 025050, Jul. 4, 2022, 16 pages.

Romano et al., "Optimization of inorganic capillary electrophoresis for the analysis of anionic solutes in real samples", Journal of Chromatography 546, 1991,411-421, Elsevier Science Publishers B.V., Amsterdam.

Chiou et al., Application of crown ethers as modifiers for the separation of amines by capillary electrophoresis. Analytica Chimica Acta. 1998;360:69-76.

Malinina et al., Large-volume sample stacking for the analysis of low molecular mass amines in steam water by CE using novel highly absorbing probe for indirect UV detection. Microchemical Journal. 2018; 137:208-213.

* cited by examiner

METHODS OF ANALYZING AND MONITORING INDUSTRIAL FLUIDS FOR CORROSIVE IONS USING CAPILLARY ELECTROPHORESIS

CROSS REFERENCE TO RELATED APPLICATION

This application claims the priority benefit of U.S. Provisional Patent Application Ser. No. 63/177,446 filed Apr. 21, 2021, the entirety of which is incorporated herein by reference.

FIELD

The disclosed technology relates to monitoring of industrial fluids for corrosive ions, and more specifically, to analyzing industrial fluids in real-time using automated capillary electrophoresis technology.

BACKGROUND

Industrial fluid systems can contain corrosive ions, which can cause corrosion and fouling of the system. Proper treatment of the industrial systems requires identifying the composition of any corrosive ionic elements and compounds, and continued monitoring of the system. Typically, industrial fluids are monitored by sampling the industrial fluids and analyzing the ion composition of the samples in off-site labs, which requires a significant amount of time.

Amines are often used as chemical treatment solutions for industrial systems and can react or degrade, causing fouling and corrosion. Several analytical methods are available to detect amines, such as liquid chromatography, high performance liquid chromatography (HPLC), gas chromatography (GC) and ion-exchange chromatography. However, analyzing mixtures of amines can require multiple analytical methods with high investment of time, labor, and cost.

Capillary electrophoresis (CE) technology has been in development for over 30 years and is a popular technique in the field of analytical separation science. However, despite the intense interest in CE among academic settings (>20,000 literature publications), CE technology has often failed to translate into routine use in commercial and industrial settings. It has arguably been underdeveloped because, liquid chromatography (LC) technology has dominated the marketplace and largely displaced applications where CE technology could be implemented.

Thus, what is needed in the art is rapid detection and real-time monitoring of corrosive ions in industrial fluids that is at least partially automated, capable of multiplexing methods, and deployable in the field.

SUMMARY

The disclosed technology provides for automated methods and systems for real-time monitoring of industrial fluids using capillary electrophoresis (CE).

Various aspects of the disclosure relate to a method for real-time monitoring of one or more industrial fluids for ionic species. The method comprises analyzing a sample comprising the one or more industrial fluids using a system comprising a capillary electrophoresis device comprising a buffer reservoir, a separation capillary, and a detector; and a processor; detecting, by way of the detector, one or more ionic species in the sample; and generating, in real-time, by way of the processor, an ionic species data profile for the sample. In various aspects, the method allows for automated, real-time identification of the one or more ionic species from a single sample in less than 1 hour. In some aspects, the ionic species data profile generated for the sample comprises up to 100 different ionic species.

In various aspects of the disclosed method, the method further comprises analyzing, in real-time, by way of the processor, the ionic species data profile for the sample; selecting, by way of the processor, the composition of one or more buffer compositions optimized to the ionic species data profile of the sample, and monitoring additional samples of the industrial fluid using the one or more buffer compositions optimized to the ionic species data profile of the sample.

In various aspects, the method further comprises modulating, by way of the processor, a parameter of an industrial process in response to the ionic species data profile.

In various aspects of the disclosed method, the buffer reservoir comprises one or more buffer compositions optimized to the sample. In some aspects, the buffer reservoir comprises 1 to 10 different optimized buffer compositions wherein each of the optimized buffer compositions is optimized for a different set of ionic species.

In various aspects of the disclosed method, the sample further comprises one or more internal standards, wherein the processor is configured to reference the internal standard.

Various aspects of the disclosure additionally relate to a system for real-time monitoring of one or more industrial fluids for ionic species, wherein the system comprises a capillary electrophoresis device comprising a buffer reservoir, a separation capillary and a detector, wherein the capillary electrophoresis device is configured to detect one or more ionic species in a sample of the one or more industrial fluids; and a computing device comprising a processor, wherein the processor is configured to generate, in real-time, an ionic species data profile for the sample. In various aspects, the system is configured to allow for automated, real-time identification of the one or more ionic species from a single sample in less than 1 hour. In some aspects, the ionic species data profile generated by the processor for the sample comprises up to 100 different ionic species.

In various aspects of the disclosed system, the processor is further configured to analyze, in real-time, the ionic species data profile for the sample; select the composition of one or more buffer compositions optimized to the ionic species data profile of the sample; and to analyze additional samples of the industrial fluid using the one or more buffer compositions optimized to the ionic species data profile of the sample.

In various aspects, the processor is further configured to modulate a parameter of an industrial process in response to the ionic species data profile.

In various aspects of the disclosed system, the buffer reservoir comprises one or more buffer compositions optimized to the sample. In some aspects, the buffer reservoir comprises 1 to 10 different customized buffer compositions wherein each of the optimized buffer compositions is optimized for a different set of ionic species.

In various aspects of the disclosed system, the sample further comprises one or more internal standards and the processor is configured to reference one or more internal standards.

In various aspects of the disclosed system, the capillary electrophoresis device is a multiplex capillary electrophoresis device.

Various aspects of the disclosure further relate to a method for real-time monitoring of a water sample, the method comprising analyzing the water sample using a system comprising a capillary electrophoresis device comprising a buffer reservoir, a separation capillary, and a detector; and a processor; detecting, by way of the detector, one or more ionic species in the water sample; and generating, in real-time, by way of the processor, an ionic species data profile for the sample.

BRIEF DESCRIPTION OF THE FIGURES

Those of skill in the art will understand that the figures, described below, are for illustrative purposes only. The figures are not intended to limit the scope of the present teachings in any way.

DETAILED DESCRIPTION

Figure 1:
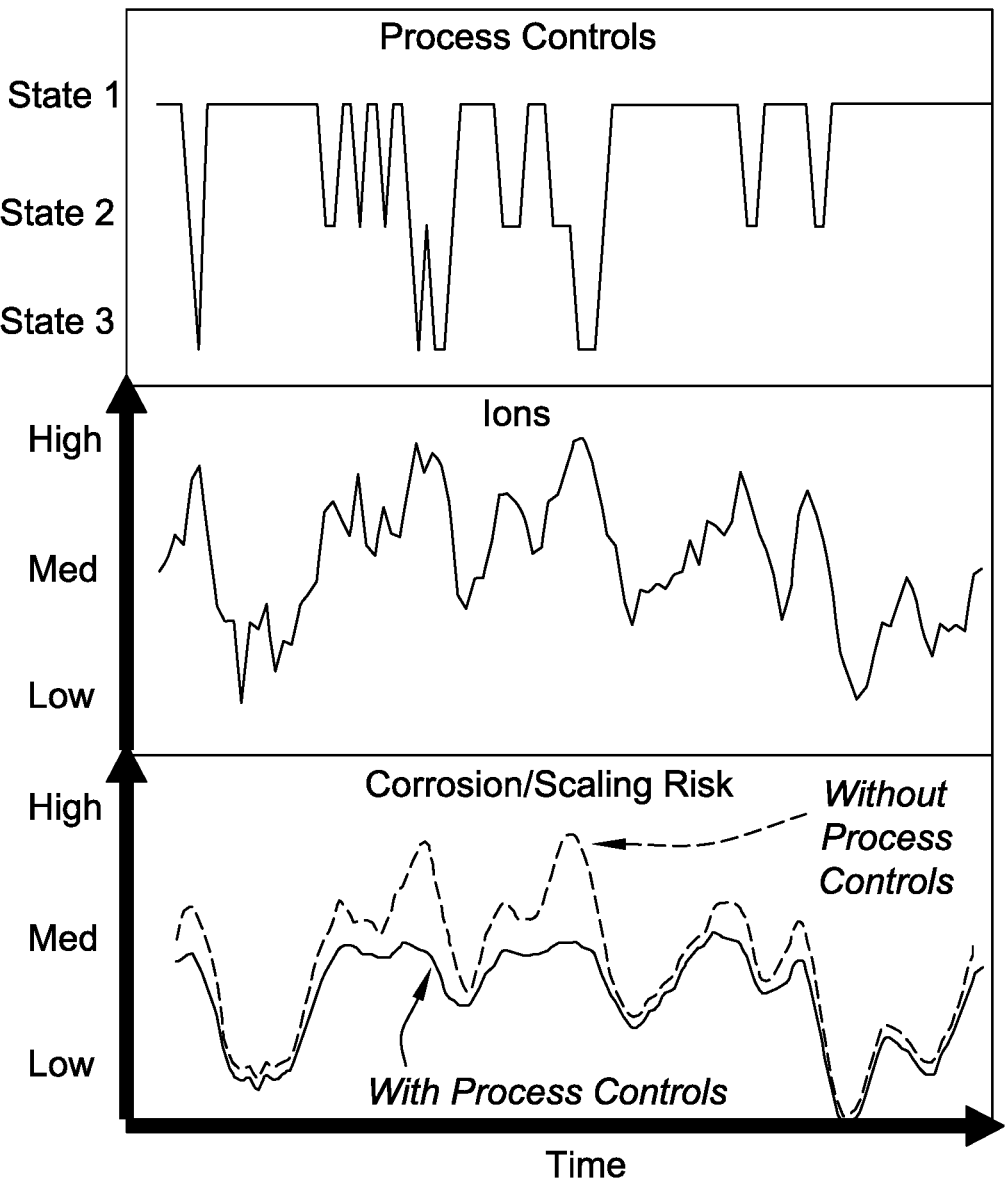
FIG. 1 is a graphic illustration of the correlation of process control adjustments made over time leading to reduced corrosion and scaling risk in an industrial process.

The disclosed technology provides for methods and systems for monitoring of ionic species in an industrial fluid using capillary electrophoresis technology, and more specifically, provides for automated methods and systems for real-time monitoring of ionic species in an industrial fluid using capillary electrophoresis technology.

Properly monitoring and treating corrosion in industrial fluids requires rapidly identifying the composition of any scaling or corrosive ionic elements and compounds present in the industrial fluid. Identification of scaling or corrosive ionic elements in industrial fluids conventionally involves distributing industrial fluid samples to a central laboratory which may run as many as five different analytical methods on the samples, which involves a large investment of time, labor and cost. Without being bound by theory, the ability to monitor these industrial fluids for scaling or corrosive ionic elements using field screening conducted in real time may be essential to properly monitoring and treating corrosion in industrial environments.

The methods and systems disclosed herein are configured to provide a high-throughput, versatile, and automated capillary electrophoresis instrument for monitoring ionic species in an industrial fluid that may be deployed in a field environment in order to reduce the cost, labor and time investment conventionally associated with monitoring ionic species. In some aspects, the methods and systems of the disclosure are configured to provide an automated capillary electrophoresis instrument capable of analyzing industrial fluid components in real time.

As used herein, the term "real-time monitoring" refers to the ability to analyze, detect and profile one or more ionic species in an industrial fluid sample in a short time, for example, in less than 1 hour. The term "short time" may also generally refer to a time that is sufficiently fast enough to properly monitor the industrial fluid sample.

As used herein, the term "industrial fluid" refers to fluids that typically may include ionic species, such as scaling or corrosive ionic species. Representative examples of industrial fluids may include a refinery fluid, a production fluid, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams and combinations thereof. The industrial fluid may further include liquids and gases. Industrial fluids may also include materials that may be solid at ambient temperatures but are liquid during an industrial process. The industrial fluid may include aqueous and non-aqueous fluids, including emulsions and other multiphase fluids which are admixtures of aqueous and non-aqueous fluids and which are present in the exploration for or production of oil and gas, during the refining of crude oil, and during the production of chemical products.

As used herein, the term "sample" refers to a smaller volume of industrial fluid that may contain an ionic species, such as a scaling or corrosive ionic species, obtained from a larger volume of the same industrial fluid.

As used herein, the term "capillary electrophoresis" refers to the separation of particles or compounds by a device including a capillary tube filled with an electrolyte solution, whereby, when an electric field is applied across the capillary, solutes migrate from one electrode toward the other electrode based on the sum of the electrophoretic mobility of the solute and the electroosmotic mobility of the bulk flow of the electrolyte.

As used herein, the term "optimized buffer composition" refers to a buffer composition specifically tailored to an industrial fluid sample that enables sensitive, rapid, reproducible and selective analysis of the ionic species in the sample using a capillary electrophoresis device.

As used herein, the term "internal standard" refers to a test compound, or a combination thereof (e.g., structurally similar analog, stable labeled compound, etc.) added to an industrial fluid sample at a known and constant concentration to facilitate identification and quantification of the target analyte(s), for example, the target ionic species.

As used herein, the term "detector" refers to a detection device that can be used to detect separation by capillary electrophoresis. Examples include UV or UV-Visual absorbance detection devices, conductivity detection devices, mass spectrometry devices, or fluorescence detection devices.

As used herein, the term "ionic species" refers to any species which exists as an ion in the industrial fluid being analyzed.

As used herein, the term "ionic species data profile" refers to an electronic profile of ionic species present in an industrial fluid sample which may be generated by a processor. The profile may include, for example, a list of ionic species as well as a detection frequency or abundance of the ionic species in a sample.

As used herein, the term "computing device" refers to an electrical device comprising at least one processor that is capable of running one or more software applications.

As used herein, the term "processor" refers to a device that performs a set of steps according to a program (e.g., a digital computer). Processors, for example, include Central Processing Units ("CPUs"), electronic devices, or systems for receiving, transmitting, storing and/or manipulating data under programmed control.

In various aspects of the disclosed technology, a method of monitoring one or more industrial fluids for ionic species is disclosed. In some aspects, the method of monitoring the one or more industrial fluids for ionic species may be automated and may further be conducted in real-time. In some aspects, the method may allow for automated, real-time identification of ionic species from a single industrial fluid sample. In some aspects, the method may be performed in less than 24 hours, or less than 12 hours, or less than 5 hours, or less than 3 hours, or less than 1 hour. In some aspects, the method may be performed in about 1 to 10 minutes.

In various aspects, the method may include analyzing a sample comprising one or more industrial fluids using capillary electrophoresis. In various aspects, suitable industrial fluids for monitoring include any industrial fluid known in the art that may contain one or more ionic species. In some aspects, suitable industrial fluids may include refinery fluids, production fluids, cooling water, process water, drilling fluids, completion fluids, production fluids, crude oil, feed streams to desalting units, outflow from desalting units, refinery heat transfer fluids, gas scrubber fluids, refinery unit feed streams, refinery intermediate streams, finished product streams and combinations thereof.

In various aspects, the method of the disclosure may be used to monitor one or more industrial fluids for scaling or corrosive ionic species such as amines, metal ions, sulfides, sulfates, phosphates, nitrates, nitrites, halides, organic acids, perchlorates, selenates, cyanides, borates, sulfonates, chelates, corrosion inhibitors and combinations thereof, as well as their degradation products. The method may further be used to monitor other ionic species, including primary, secondary, tertiary, and quaternary amines such as methylamine, ethylamine, ethanolamine, cyclohexylamine, morpholine, monoethanolamine, dimethylethanolamine and pyridines, ammonia, alkali and alkaline metals, such as sodium, potassium, magnesium and calcium, and combinations thereof.

In some aspects, the industrial fluid sample may include a plurality of cationic species. In some aspects the industrial fluid may include a plurality of amines, such as from about 5 to about 25 amines. In some examples, the industrial fluid sample may include at least 5 amines, at least 10 amines, or at least 20 amines.

In various aspects, the method may include analyzing a sample comprising the one or more industrial fluids using a system comprising a capillary electrophoresis device coupled to a processor. The method may be implemented using any suitable capillary electrophoresis device that can effect separation of one or more ionic species. In some aspects, the method may be implemented using commercially available capillary electrophoresis devices. In some aspects, suitable capillary electrophoresis devices may include single channel devices, dual channel devices, multistack devices, and the like. In some aspects, the capillary electrophoresis device may be a multiplex capillary electrophoresis device including up to 200 capillaries, or up to 10 capillaries, or between 2 and 10 capillaries.

In various aspects, the sample may be introduced directly into the capillary electrophoresis device. In some aspects, the sample may be pre-treated prior to being subjected to capillary electrophoresis. For example, particulate matter may be removed from the sample by filtration prior to introducing the sample into the capillary electrophoresis device. In some aspects, the pH of the sample may be altered to, for example, improve separation or increase interaction between the ionic species and a chromatography matrix, depending on the nature of the ionic species. In some aspects, the sample may be prepared using suitable modifiers to optimize mobility and elution of the ionic species through the capillary electrophoresis device. In one example, a crown ether may be added to a sample to improve mobility of primary amines present in the sample. In other aspects, the sample may be prepared using suitable probes to facilitate detection of an ionic species by a detector coupled to the electrophoresis device. In some aspects, the industrial fluid sample may be treated with a pre-concentrator to increase the relative concentration of an ionic species of interest, and reducing the presence of undesirable fluid. In some aspects, the industrial fluid sample may be subjected to an extraction process or heating prior to being introduced into the capillary electrophoresis device.

In various aspects, the capillary electrophoresis device may include at least a buffer reservoir, a separation capillary, and a detector. In various aspects, the buffer reservoir may include a buffer solution comprising one or more background electrolytes. In some aspects, the background electrolyte may be present in the buffer solution in a concentration of from 0.01 mg/L to 1 mg/L. In various aspects, the buffer solution may be characterized by an alkaline pH, such as a pH between 8 and 11.

In some aspects, the capillary electrophoresis device comprises a separation capillary manufactured from a suitable material. In some aspects, commercially available separation capillaries may be used. In various aspects, the separation capillary may be coated or uncoated. In some aspects, the separation capillary may be manufactured from a fused-silica material. In some aspects, the separation capillary may include a chromatography matrix packed with an acidic cation exchanger.

In various aspects, the separation capillary may include an eluent configured to move the sample through the separation capillary. In some aspects, the eluent may include a polar aprotic solvent, such as, but not limited to, acetonitrile. In one aspect, the eluent may include the polar aprotic solvent in an amount of from about 0.05% to about 25% by volume, based on the volume of the eluent. In other aspects, the eluent may include an acid, such as, but not limited to, citric acid. In one aspect, the eluent may include the acid at a concentration between about 1 mM to about 100 mM.

In various aspects, the one or more ionic species in the sample may travel at different speeds through the separation capillary. The resulting eluate containing the separated ionic species may be collected as one or more fractions, using any suitable method known in the art, to obtain one or more substantially pure eluates for further analysis. "Substantially pure" as used herein, refers to an eluate, for example, with greater than 95 wt % of the desired ionic species, based on the total weight of solute in the eluate. In some embodiments, the eluate contains low amounts of undesirable species and can include less than 5 wt %, less than 3 wt %, less than 2 wt %, less than 1 wt % or less than 0.5 wt % undesirable species, based on the total weight of solute in the eluate.

In various aspects, elution may be carried out at any suitable temperature for improved selectivity of ion-exchange reactions and efficiency of the separation capillary, thus influencing the quality of the separation. In some aspects, the elution temperature, (including the temperature of the separation capillary including the eluent and the matrix) may be from about 10° C. to about 80° C. For example, the elution temperature may be from about 15° C. to about 70° C., about 25° C. to about 70° C., about 30° C. to about 70° C., about 35° C. to about 70° C., about 15° C. to about 45° C., or about 15° C. to about 35° C.

In various aspects, the method may include detecting, by way of a detector, the one or more ionic species in the eluate. Suitable detectors may include any detection device that is capable of identifying and/or quantifying the separated ionic species. In some aspects, commercially available detectors for use with capillary electrophoresis devices may be used. Suitable detectors may include UV and visual light absorption detectors, diode array detectors, fluorescence detectors, mass spectrometers, nuclear magnetic resonance devices, surface enhanced Raman scattering devices, conductivity detectors, and the like. In some aspects, a hybrid detector incorporating the capillary electrophoresis device may be used.

In various aspects, the method may include generating, in real-time, by way of the processor, an ionic species data profile for the sample. In some aspects, the method may include generating, in real-time, an ionic species data profile comprising up to 100 different ionic species, up to 40 different ionic species, up to 30 different ionic species, or up to 20 different ionic species. In some aspects, the processor may be configured to provide an ionic species data profile for the sample that includes a description of various characteristics of the ionic species in the sample, such as the identity of the one or more ionic species in the sample, the frequency of appearance of one or more ionic species in the sample, or any other information suitable for optimal analysis of the industrial fluid sample.

In various aspects, the method may additionally involve analyzing, in real-time, by way of the processor, the ionic species data profile for the sample, and selecting, by way of the processor, the composition of one or more buffer compositions optimized to the ionic species data profile of the sample.

The method may further involve analyzing additional samples of the industrial fluid using the one or more optimized buffer compositions to enable sensitive, rapid, reproducible and selective analysis of the ionic species in the sample using a capillary electrophoresis device.

In some aspects of the disclosed method, the analysis of additional samples of the industrial fluid involves adding the one or more optimized buffer compositions to the buffer reservoir of the capillary electrophoresis device used to analyze the initial sample. In some aspects, any suitable number of optimized buffer compositions may be added to the buffer reservoir. In some aspects, 1 to 10 different optimized buffer compositions may be added to the buffer reservoir. In some aspects, the 1 to 10 different optimized buffer compositions may each be optimized for a different set of ionic species.

In various aspects, the optimized buffer composition may include any background electrolyte that is suitable or optimal for use based on the ionic species data profile of the analyzed sample. Suitable background electrolytes may include at least one of a weak acid, a weak base, a strong acid, a strong base, a selectivity modifier, a surfactant, a UV or visible light absorbing probe, or an organic modifier. Without being bound by theory, a weak acid or base may be provided in the optimized buffer composition for pH control. A strong acid or base may be provided in the optimized buffer composition for control of ionic strength. One or more selectivity modifiers may be provided in the optimized buffer composition to control resolution of the ionic species. Surfactants may be provided in the optimized buffer composition to control surface adsorption and control peak shapes of the ionic species. UV or visible light absorbing probes may be provided in the optimized buffer composition for enabling an indirect detection of the ionic species. Organic modifiers may be provided in the optimized buffer composition to control viscosity, zeta potential, and resolution of the ionic species.

In various aspects, the sample may include one or more internal standards. In some aspects of the disclosed method, the processor may be configured to reference the one or more internal standards in the sample. Without being bound by theory, referencing the relative position (time) and intensity of the internal standard improves the precision of the capillary electrophoresis analysis, improves the accuracy of the capillary electrophoresis analysis and enables ionic species to be determined automatically by the processor without the need for manual review. In various aspects, the sample may include any number of internal standards needed to improve the precision of the capillary electrophoresis analysis. In some aspects, the sample may contain 1 to 5 internal standards.

In other aspects, the internal standard may alternatively be added to the buffer reservoir or the optimized buffer composition.

In various aspects, the method of the disclosure may be implemented using a system comprising a capillary electrophoresis device comprising a buffer reservoir, a separation capillary and a detector, wherein the capillary electrophoresis device is configured to detect one or more ionic species in a sample of the one or more industrial fluids; and a computing device comprising a processor, wherein the processor may be configured to generate, in real-time, an ionic species data profile for the sample.

In some aspects, the computing device and/or the processor may be coupled to the capillary electrophoresis device. In some aspects, the processor may be configured to generate an ionic species data profile for the sample including up to 100 different ionic species, up to 40 different ionic species, up to 30 different ionic species, or up to 20 different ionic species.

In some aspects, the processor may additionally be configured to analyze, in real-time, the ionic species data profile for the sample and select the composition of one or more buffer compositions optimized to the ionic species data profile of the sample that would enable sensitive, rapid, reproducible and selective analysis of the ionic species in the sample using a capillary electrophoresis device. The processor may further be configured to analyze additional samples of the industrial fluid using the one or more optimized buffer compositions.

In various aspects, the limits of detection (LOD) of the system of the disclosure may be as low as 0.003 mg/L. In some aspects, the minimum detection level for a particular ionic species may be about 10 ppb. The minimum detection level of each ionic species in a sample may be about 10 ppb or greater. In some aspects, the detection level for each ionic species may be about 1 ppm or greater, about 2 ppm or greater, about 3 ppm or greater, about 4 ppm or greater, about 5 ppm or greater, or about 10 ppm or greater.

In some aspects, the disclosed system may include additional devices that may be coupled to the capillary electrophoresis device and/or the computing device. Examples include sample extraction devices, corrosion detection devices, and any other devices that may be necessary to properly analyze ionic species contained in an industrial fluid.

Described herein are also methods for controlling and/or monitoring industrial fluids using the ionic species data profile obtained from an industrial fluid sample. In some aspects, the processor may be configured to reference the ionic species data profile, and may further be directly employed in helping to control or modify a parameter of an industrial process. Parameters related to, for example an industrial fluid, that can be altered, by way of the processor, based upon the ionic species data profile may include temperature, amount of the ionic species, pressure, and combinations thereof. For example, the processor may be configured to alter the temperature of an industrial process in order to avoid the formation or deposition of solid amine hydrochloride salts within the process equipment if the concentration of a particular amine is determined to be above a pre-determined threshold value. As another example, the processor may be configured to reference the amount of specific amines or inorganic ions (such as chlorides), and subsequently optimize process parameters of a desalter.

In various aspects, the processor may also be configured to reference the ionic species data profile generated using the disclosed method and speed up or slow down a specific process stream in response to a concentration of an undesirable ionic species. In another aspect, the processor may be configured to reference the ionic species data profile and change the pH of a process stream, optimize the dosage of additives such as corrosion inhibitors, hydrate inhibitors, anti-fouling agents, antifoaming agents, anti-scaling agents, demulsifiers and the like. In another aspect, the processor may be configured to input the ionic species data profile into a computer model of a process. This may be used to indicate changes to feed stream rates, temperature, and/or pressures for efficient operation of a refinery.

Figure 2:
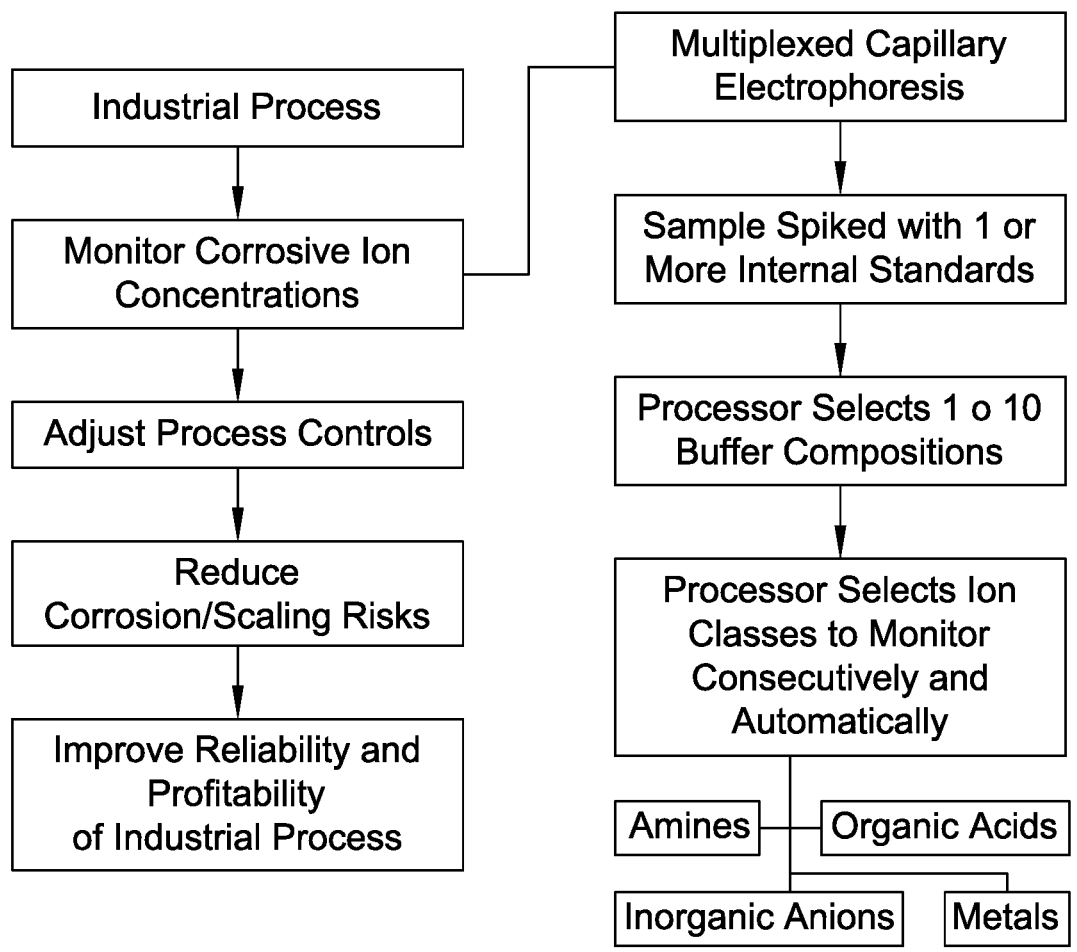
FIG. 2 is a schematic illustration of an embodiment of a method of the disclosure whereby the reliability and profitability of an industrial process is optimized by means of monitoring corrosive ions over time using multiplexed capillary electrophoresis, adjusting process controls and reducing corrosion and scaling risks.

FIGS. 1 and 2 represent, respectively, a graphic and schematic illustration of a method of monitoring scaling and/or corrosive ions over time in an industrial process using multiplexed capillary electrophoresis, adjusting process controls, and subsequently reducing corrosion and scaling risk. As shown in FIG. 2, an industrial fluid sample used in an industrial process may be subjected to a monitoring step to determine corrosive ion concentrations in the industrial fluid sample. The monitoring step includes subjecting the industrial fluid sample to multiplexed capillary electrophoresis wherein the industrial fluid sample is spiked with one or more internal standards. A processor then selects 1 to 10 buffer compositions and further selects ion classes to monitor consecutively and automatically, wherein the ion classes may include amines, organic acids, inorganic anions and metals. Based on the ion concentrations determined in the monitoring step, process controls may be adjusted, thus reducing corrosion and scaling risks and improving the reliability and profitability of the industrial process.

EXAMPLES

The present technology will be further described in the following examples, which should be viewed as being illustrative and should not be construed to narrow the scope of the disclosed technology or limit the scope to any particular embodiments.

Example 1

Improved Specificity and Resolution

Figure 3:
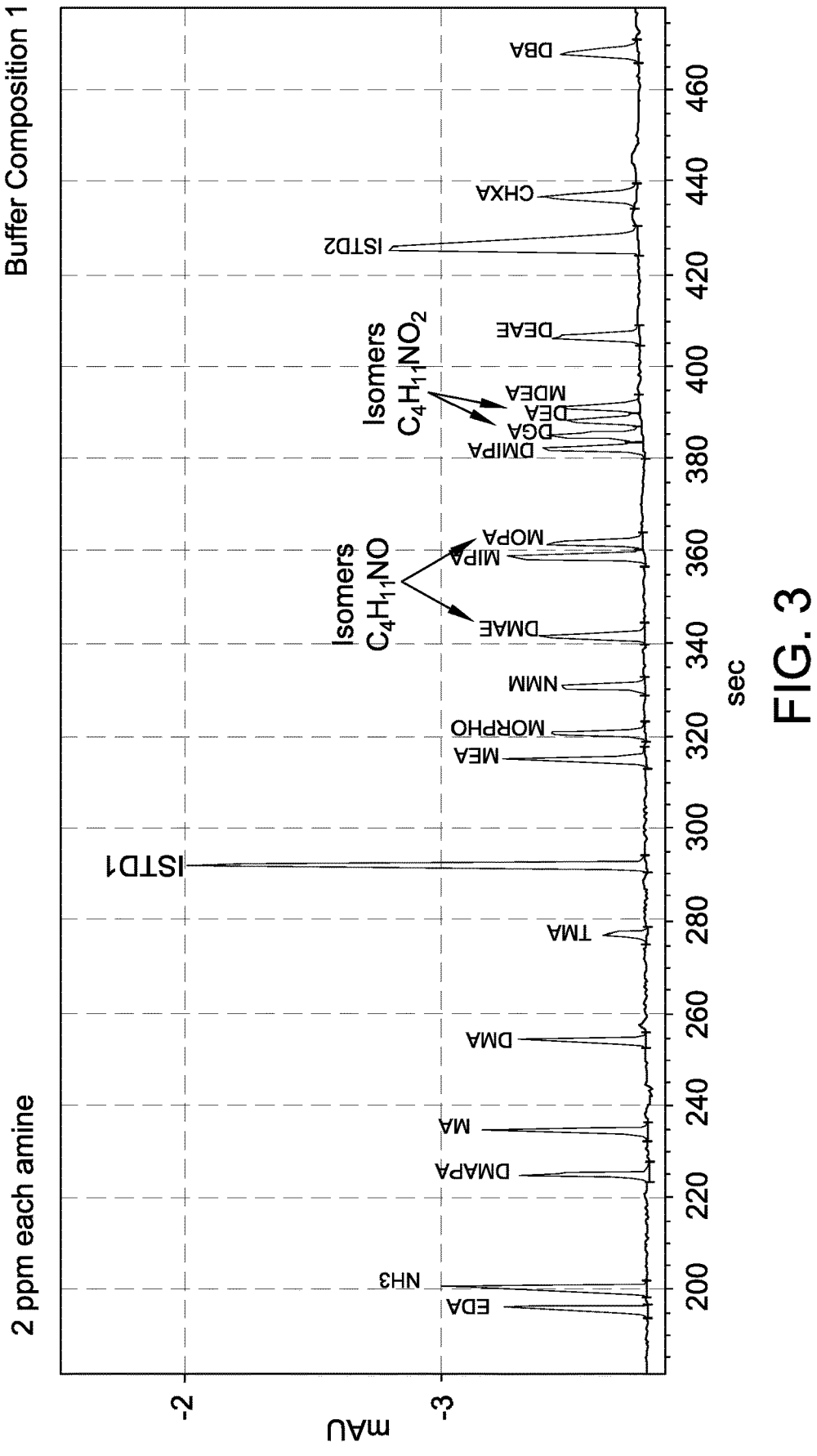
FIG. 3 illustrates an exemplary ionic species data profile from a sample including a Buffer Composition 1 and generated by the methods of the disclosure.

A Buffer Composition 1 was selected for use in an industrial fluid sample. As shown in FIG. 3, use of Buffer Composition 1 allowed for 19 amine components to be determined over an 8 minute run time. Automated peak recognition by monitoring internal standards (ISTD1 and ISTD2) was used to adjust for migration time shifts. The analysis speed and resolution were improved compared to ion chromatography. A different ion panel can subsequently be determined by selecting a different buffer composition.

Example 2

Improved Speed and Breadth of Analysis

Figure 4:
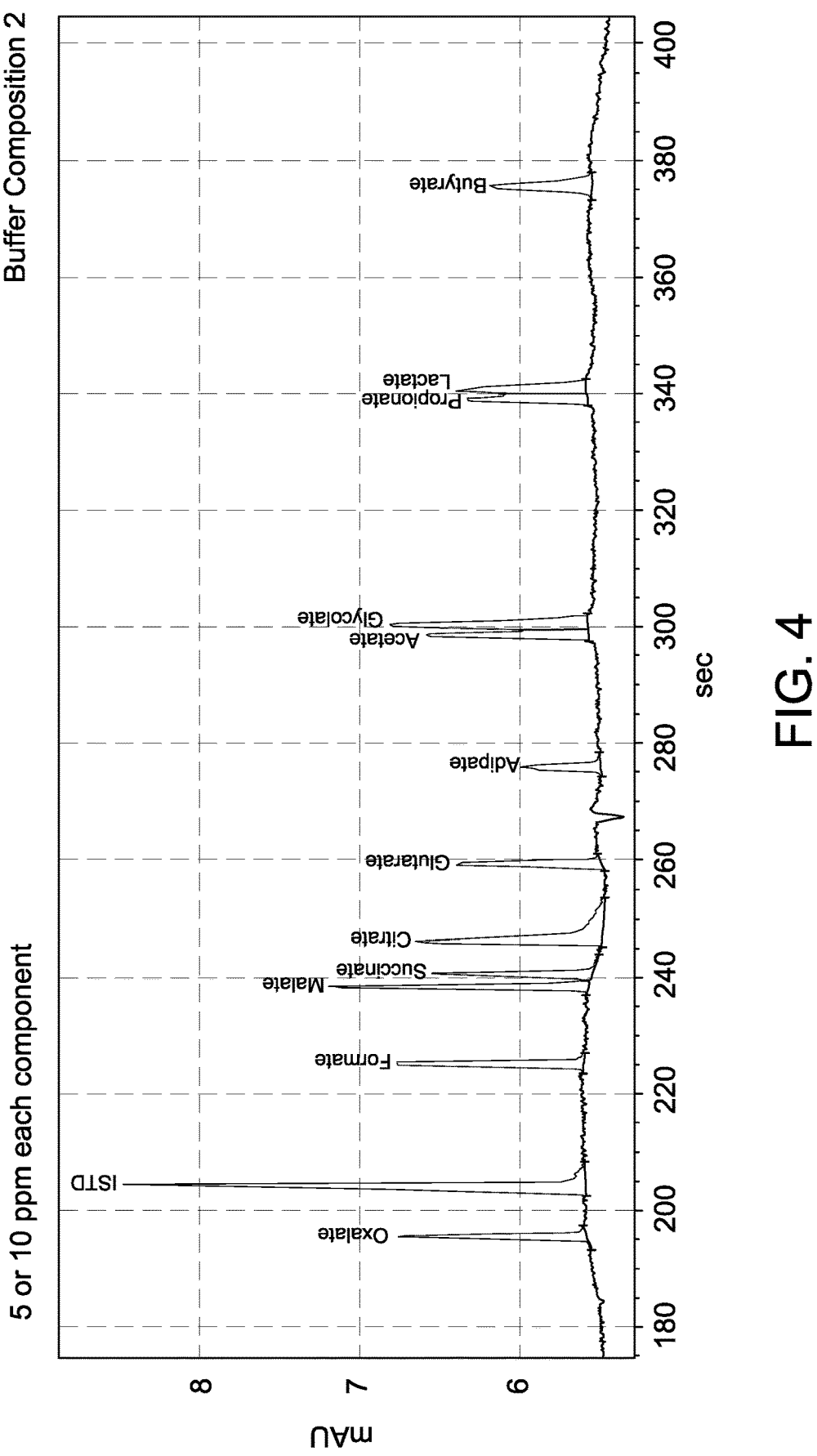
FIG. 4 illustrates an exemplary ionic species data profile from a sample including a Buffer Composition 2 and generated by the methods of the disclosure.

A Buffer Composition 2 was selected for use in an industrial fluid sample. As shown in FIG. 4, use of Buffer Composition 2 allowed for 12 organic acids to be determined over a 7 minute run time. Automated peak recognition by monitoring internal standards (ISTD) was used to adjust for migration time shifts. The number of parameters and sample throughput were improved compared to ion chromatography. A different ion panel can subsequently be determined by selecting a different buffer composition.

Example 3

Improved Multiplexing

Figure 5:
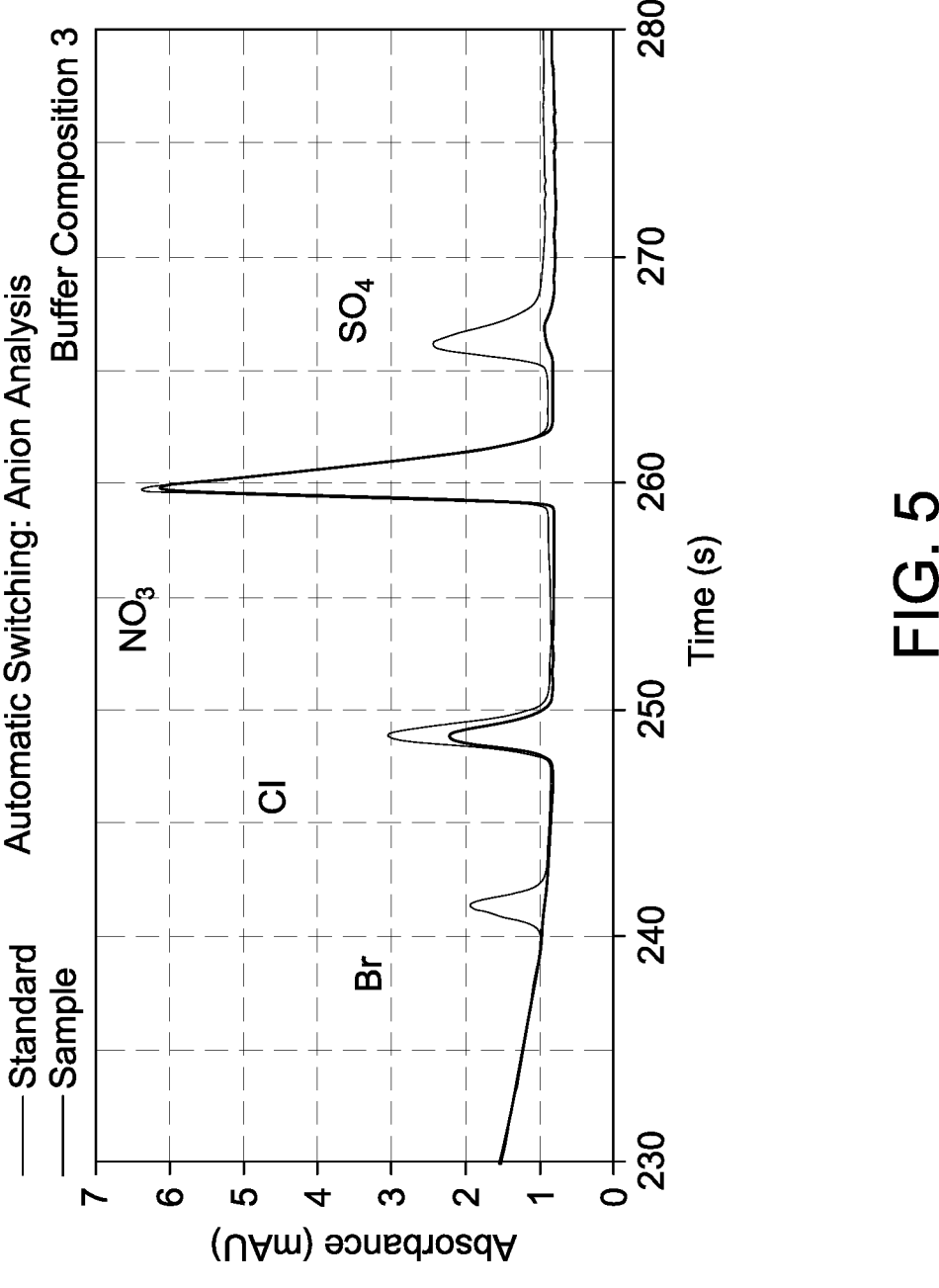
FIG. 5 illustrates an exemplary ionic species data profile from a sample including a Buffer Composition 3 and generated by the methods of the disclosure.
Figure 6:
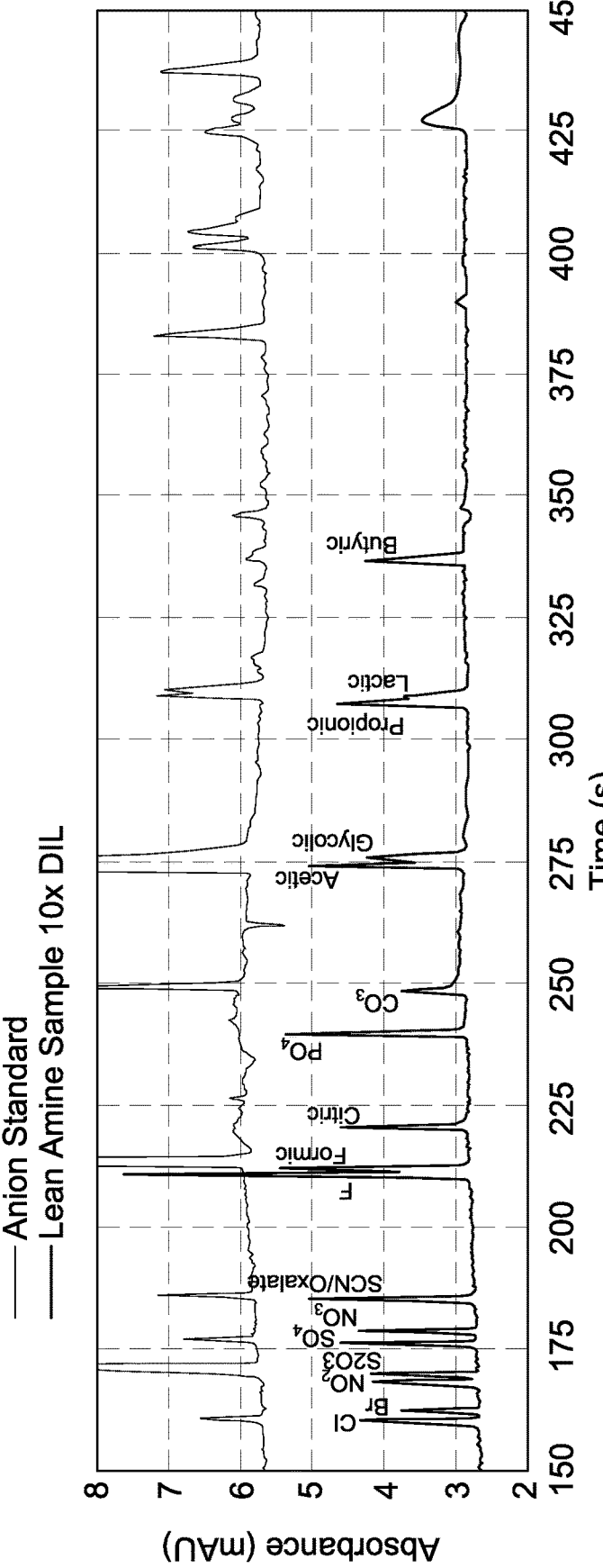
FIG. 6 illustrates an exemplary ionic species data profile from a sample including a Buffer Composition 4 and generated by the methods of the disclosure.

A Buffer Composition 3 was selected for use in an industrial fluid sample. As shown in FIG. 5, use of Buffer Composition 3 allowed for 4 inorganic anions to be determined over a 5 minute run time. Automated peak recognition by monitoring internal standards was used to adjust for migration time shifts. The number of parameters and sample throughput were improved compared to ion chromatography. A different ion panel can subsequently be determined by selecting a different buffer composition.

Example 4

Improved Matrix Tolerance

A Buffer Composition 4 was selected for use in an industrial fluid sample. As shown in FIG. 5, use of Buffer Composition 4 allowed for 19 anion/acid components to be determined over an 8 minute run time. Furthermore, the analysis was compatible with process samples high in organic content (lean amine sample 10×DIL). The number of parameters and sample throughput were improved when compared to ion chromatography.

Example 5

The disclosed method was successfully applied to the determination of amines in refinery process water samples including overhead boot waters, desalter brines, and others. The analytical results (CE-UV) were compared against those obtained by reference ion chromatography (IC) methods. The results of the comparison are shown in Table 1 below.

TABLE 1

| Metric | IC-MS (Lab Method) | IC Conductivity (Field Method) | CE-UV |
|---|---|---|---|
| Reporting Limit | 0.1-1 ppm | 1-5 ppm | 0.5-1 ppm |
| Sample Throughput | 30 samples/day | 12 samples/day | 40 samples/day |

TABLE 1-continued

| Metric | IC-MS (Lab Method) | IC Conductivity (Field Method) | CE-UV |
|---|---|---|---|
| Accuracy | ±50% | ±25% | ±20% |
| Ease of Operation | Low | Medium | High |
| Cost | High | Medium | Low |
| Missed SZ analytes | NH₃, Cl | EDA, DBA, DMAPA, Cl | None |
| Risk of Interferences | Very Low | Medium | Low |
| Potential for Automation | Low | Medium | High |
| Number of Other Amines | ~20 | 0 | ~5 |

As shown in Table 1, the CE-UV method was able to provide an automatable process capable of processing a higher number of sample throughputs with a high degree of accuracy, superior ease of operation, and low cost.

Example 6

As shown in Table 2 below, capillary electrophoresis (CE-UV) analysis delivered superior accuracy following a blind, independent round robin study including 8 participating labs (PL).

TABLE 2

| | | | | | | | | | |
|---|---|---|---|---|---|---|---|---|---|
| | | ILT-Q221-S2 Results (µg/mL) | | | | | | | |
| | | IC-MS[1] | | IC-CD[2] | | | | CE-UV | |
| Amine | Target | PL-01 | PL-02 | PL-03 | PL-04 | PL-05 | PL-06 | PL-07 | PL-08 |
| CHXA | 5.0 | 4.0 | 3.7 | 4.3 | 9.5 | 3.4 | 1.9 | 5.2 | 6.8 |
| DMA | 25.0 | 27.1 | 20.9 | 29.5 | 47.9 | 26.3 | 23.2 | 25.0 | 24.3 |
| DMAE | 3.0 | 1.8 | 3.1 | 2.2 | 2.4 | 3.2 | 0.0 | 2.9 | 2.9 |
| DMIPA | 25.0 | 21.9 | 25.5 | 27.7 | 28.7 | 23.5 | 18.9 | 24.4 | 23.9 |
| MA | 3.0 | 1.6 | 4.3 | 1.6 | 3.1 | 2.3 | 2.6 | 3.1 | 3.1 |
| MEA | 25.0 | 24.8 | 17.5 | 29.8 | 41.2 | 24.6 | 24.6 | 23.9 | 24.3 |
| MOPA | 3.0 | 1.1 | 0.0 | 1.5 | 2.8 | 3.2 | 0.0 | 3.3 | 3.2 |
| MORPHO | 25.0 | 29.2 | 8.8 | 24.6 | 23.4 | 22.8 | 18.4 | 25.1 | 24.3 |
| NH3 | 3.0 | — | — | 2.9 | 2.2 | 2.8 | 1.0 | 3.0 | 3.1 |
| NMM | 25.0 | 28.3 | 22.3 | 24.2 | 27.1 | 23.7 | 21.6 | 25.8 | 23.3 |
| Amines Outside ± 30% | | 3 | 3 | 2 | 3 | 1 | 4 | 0 | 1 |
| % Outside ± 30% | | 33% | 33% | 20% | 30% | 10% | 40% | 0% | 10% |

[1]IC-MS = ion chromatography mass spectrometry
[2]IC-CD = ion chromatography conductivity While embodiments of the disclosed technology have been described, it should be understood that the present disclosure is not so limited and modifications may be made without departing from the disclosed technology. The scope of the disclosed technology is defined by the appended claims, and all devices, processes, and methods that come within the meaning of the claims, either literally or by equivalence, are intended to be embraced therein.

The invention claimed is:

1. A method for real-time monitoring of one or more industrial fluids for ionic species, wherein the method comprises:

analyzing a sample comprising the one or more industrial fluids using a system comprising:

a capillary electrophoresis device comprising a buffer reservoir, a separation capillary, and a detector; and a processor;

detecting, by way of the detector, one or more ionic species in the sample;

generating, in real-time, by way of the processor, an ionic species data profile for the sample;

analyzing, in real-time, by way of the processor, the ionic species data profile for the sample; and modulating, by way of the processor, a parameter of an industrial process in response to the ionic species data profile.

2. The method of claim 1, further comprising:

selecting, by way of the processor, the composition of one or more buffer compositions optimized to the ionic species data profile of the sample; and monitoring additional samples of the industrial fluid using the one or more buffer compositions optimized to the ionic species data profile of the sample.

3. The method of claim 1, wherein the buffer reservoir comprises one or more buffer compositions optimized to the sample, and wherein the one or more buffer compositions optimized to the sample comprise at least one of a weak acid, a weak base, a strong acid, a strong base, a selectivity modifier, a surfactant, a UV or visual light absorbing probe, or an organic modifier.

4. The method of claim 3, wherein the buffer reservoir comprises 1 to 10 different buffer compositions optimized to the sample, wherein each of the buffer compositions are optimized for a different set of ionic species present in the sample.

5. The method of claim 1, wherein the sample further comprises one or more internal standards.

6. The method of claim 1, wherein the method allows for automated, real-time, identification of the one or more ionic species from a single sample, and wherein the one or more ionic species comprises amines, organic acids, inorganic anions or metals.

7. The method of claim 1, wherein the method comprises generating, in real time, by way of the processor, an ionic species data profile comprising up to 100 different ionic species.

8. The method of claim 1, wherein the parameter of an industrial process comprises temperature, amount of the ionic species, or pressure.

9. A system for real-time monitoring of one or more industrial fluids for ionic species, wherein the system comprises:

a capillary electrophoresis device comprising a buffer reservoir, a separation capillary and a detector, wherein the capillary electrophoresis device is configured to detect one or more ionic species in a sample of the one or more industrial fluids; and a computing device comprising a processor, wherein the processor is configured to generate, in real-time, an ionic species data profile for the sample;

analyze, in real-time, the ionic species data profile for the sample; and modulate a parameter of an industrial process in response to the ionic species data profile.

10. The system of claim 9, wherein the processor is further configured to select the composition of one or more buffer compositions optimized to the ionic species data profile of the sample; and analyze additional samples of the industrial fluid using the one or more buffer compositions optimized to the ionic species data profile of the sample.

11. The system of claim 9, wherein the buffer reservoir comprises one or more buffer compositions optimized to the sample, wherein the one or more buffer compositions optimized to the sample comprise at least one of a weak acid, a weak base, a strong acid, a strong base, a selectivity modifier, a surfactant, a UV or visual light absorbing probe, or an organic modifier.

12. The system of claim 11, wherein the buffer reservoir comprises 1 to 10 different buffer compositions optimized to the sample, each optimized for a different set of ionic species present in the sample.

13. The system of claim 9, wherein the sample further comprises one or more internal standards.

14. The system of claim 9, wherein the method allows for automated, real-time, identification of the one or more ionic species from a single sample.

15. The system of claim 9, wherein the one or more ionic species comprises amines, organic acids, inorganic anions or metals.

16. The system of claim 9, wherein the method comprises generating, in real time, by way of the processor, an ionic species data profile comprising up to 100 different ionic species.

17. The system of claim 9, wherein the system is configured to generate the ionic species data profile in (i) less than 1 hour, or (ii) less than 10 minutes.

18. The system of claim 9, wherein the capillary electrophoresis device is a multiplex capillary electrophoresis device.

19. The system of claim 18, wherein the multiplex capillary electrophoresis device comprises (i) up to 200 capillaries, or (ii) 2 to 10 capillaries.

20. The system of claim 9, wherein the parameter of an industrial process comprises temperature, amount of the ionic species, or pressure.

21. A method for real-time monitoring of a water sample, the method comprising analyzing the water sample using a system comprising:
  a capillary electrophoresis device comprising a buffer reservoir, a separation capillary, and a detector; and
  a processor;

detecting one or more ionic species in the water sample using the detector;

generating, in real-time, by way of the processor, an ionic species data profile for the water sample; and determining a treatment plan for the water sample, wherein the ionic species comprises amines.

22. The method of claim 21, further comprising:

analyzing, in real-time, by way of the processor, the ionic species data profile for the water sample;

selecting, by way of the processor, a composition of one or more buffer compositions optimized to the ionic species data profile of the water sample;

monitoring additional water samples using the one or more buffer compositions optimized to the ionic species data profile of the water sample, and modulating, by way of the processor, a parameter in response to the ionic species data profile, wherein the parameter comprises temperature, amount of the ionic species or pressure.

* * * * *